(12) United States Patent
Thieu et al.

(10) Patent No.: US 11,060,665 B2
(45) Date of Patent: Jul. 13, 2021

(54) INSTALLATION AND METHOD FOR FILLING TANKS WITH PRESSURIZED FLUID

(71) Applicant: L'Air Liquide, Societe Anonyme pour l'Etude et l'Exploitation des Procedes Georges Claude, Paris (FR)

(72) Inventors: Anh Thao Thieu, Saint Cloud (FR); Guillaume Cardon, Igny (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 60 days.

(21) Appl. No.: 16/685,195

(22) Filed: Nov. 15, 2019

(65) Prior Publication Data

US 2020/0156924 A1 May 21, 2020

(30) Foreign Application Priority Data

Nov. 15, 2018 (FR) ...................................... 1860536

(51) Int. Cl.
*F17C 5/02* (2006.01)
*B67D 7/04* (2010.01)
(Continued)

(52) U.S. Cl.
CPC .................. *F17C 5/02* (2013.01); *B67D 7/04* (2013.01); *B67D 7/36* (2013.01); *B67D 7/38* (2013.01);
(Continued)

(58) Field of Classification Search
CPC .... F17C 5/02; F17C 5/06; F17C 13/00; F17C 13/04; F17C 1/12; F17C 2223/036; F17C 2223/033; F17C 2223/0161; F17C 2227/0139; F17C 2227/03; F17C 2227/0304; F17C 2227/0311; F17C 2227/039; F17C 2227/0337; F17C 2250/0439; F17C 2250/0631;
(Continued)

(56) References Cited

U.S. PATENT DOCUMENTS 5,479,966 A   1/1996 Tison et al.
5,771,946 A   6/1998 Kooy et al.
(Continued)

FOREIGN PATENT DOCUMENTS

FR          3 005 135         10/2014
FR          3 022 233         12/2015
WO     WO 2017/186337        11/2017

OTHER PUBLICATIONS

French Search Report and Written Opinion for FR 1 860 536, dated Jul. 4, 2019.

(Continued)

*Primary Examiner* — Nicolas A Arnett
(74) *Attorney, Agent, or Firm* — Christopher J. Cronin

(57) ABSTRACT

Installation and method for filling tanks with pressurized gas in which fluid supplied to the buffer storage reservoir is at a relatively higher first temperature while fluid is being withdrawn from the buffer storage reservoir to fill a tank and fluid is supplied to the buffer storage reservoir at a relatively lower second temperature when fluid is not being withdrawn from the buffer storage reservoir to fill a tank.

13 Claims, 1 Drawing Sheet

(51) Int. Cl.
*B67D 7/36* (2010.01)
*B67D 7/38* (2010.01)
*B67D 7/62* (2010.01)
*B67D 7/78* (2010.01)
*B67D 7/80* (2010.01)
*F17C 1/12* (2006.01)
*F17C 13/04* (2006.01)

(52) U.S. Cl.
CPC .............. *B67D 7/62* (2013.01); *B67D 7/78* (2013.01); *B67D 7/80* (2013.01); *F17C 1/12* (2013.01); *F17C 13/04* (2013.01); *F17C 2203/0329* (2013.01); *F17C 2203/0391* (2013.01); *F17C 2205/0323* (2013.01); *F17C 2205/0326* (2013.01); *F17C 2205/0338* (2013.01); *F17C 2221/012* (2013.01); *F17C 2223/0161* (2013.01); *F17C 2223/033* (2013.01); *F17C 2223/036* (2013.01); *F17C 2225/0161* (2013.01); *F17C 2227/0135* (2013.01); *F17C 2227/03* (2013.01); *F17C 2227/0304* (2013.01); *F17C 2250/01* (2013.01); *F17C 2250/032* (2013.01); *F17C 2250/0439* (2013.01); *F17C 2250/0631* (2013.01); *F17C 2265/065* (2013.01); *F17C 2270/0139* (2013.01); *F17C 2270/0178* (2013.01); *F17C 2270/0184* (2013.01); *Y02E 60/32* (2013.01)

(58) Field of Classification Search
CPC ............ F17C 2250/01; F17C 2250/032; F17C 2270/0139; F17C 2270/0178; F17C 2225/0161; F17C 2225/035; F17C 2205/0323; F17C 2205/0326; F17C 2205/0338; F17C 2221/012; F17C 2265/065; F17C 2201/054; B67D 7/04; B67D 7/36; B67D 7/38; B67D 7/62; B67D 7/78; B67D 7/80; Y02E 60/32
See application file for complete search history.

(56) References Cited

U.S. PATENT DOCUMENTS

| | | | |
|---|---|---|---|
| 6,354,088 | B1 | 3/2002 | Emmer et al. |
| 10,451,219 | B2* | 10/2019 | Ravinel ................ F17C 5/007 |
| 2008/0282709 | A1* | 11/2008 | Sugawara ............... F17C 7/00 62/48.1 |
| 2015/0192249 | A1* | 7/2015 | Arpentinier ............. F17C 9/04 141/4 |
| 2015/0362128 | A1 | 12/2015 | Sanglan et al. |
| 2016/0084441 | A1 | 3/2016 | Fauvel et al. |
| 2017/0191620 | A1* | 7/2017 | Caristan .................. F17C 7/04 |
| 2017/0191621 | A1* | 7/2017 | Caristan .................. F17C 7/04 |
| 2017/0291486 | A1* | 10/2017 | Tanaka ................. F02M 25/10 |
| 2019/0137041 | A1 | 5/2019 | Reese et al. |
| 2019/0271439 | A1* | 9/2019 | Lopez ................. G05D 16/028 |
| 2019/0331298 | A1* | 10/2019 | Thor ....................... F17C 6/00 |
| 2020/0095113 | A1* | 3/2020 | Crispel ................... F17C 5/06 |

OTHER PUBLICATIONS

Raman, et al., "A Rapid Fill Hydrogen Fuel Station for Fuel Cell Buses", Hydrogen Energy Progress XII, Proceedings of the WHEConference, 12th, Buenos Aires, 1998, 14 pgs.

* cited by examiner

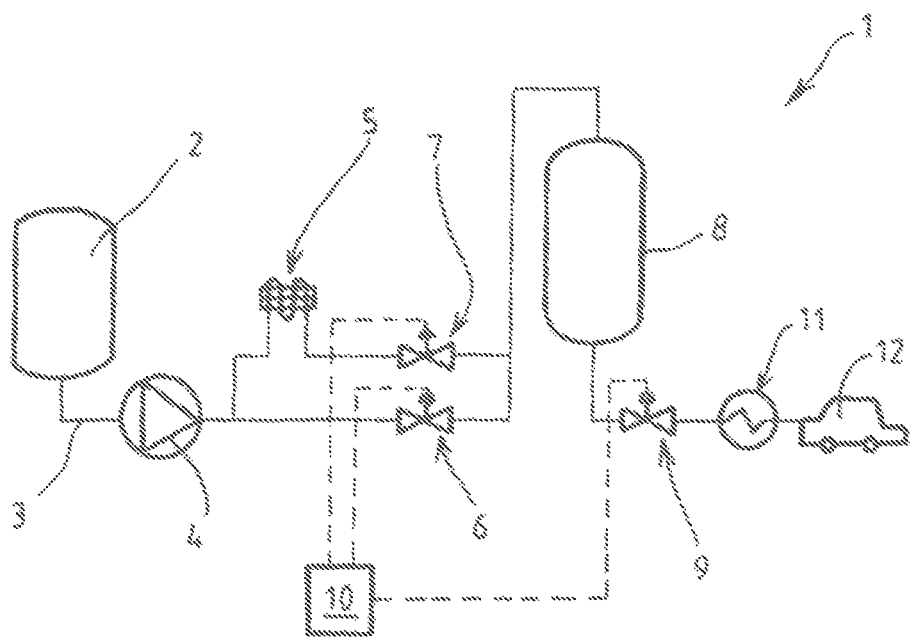

INSTALLATION AND METHOD FOR FILLING TANKS WITH PRESSURIZED FLUID

CROSS-REFERENCE TO RELATED APPLICATIONS

This application claims the benefit of priority under 35 U.S.C. § 119 (a) and (b) to French patent application No. FR 1860536, filed Nov. 15, 2018, the entire contents of which are incorporated herein by reference.

BACKGROUND

Field of the Invention

The invention relates to an installation and a method for filling tanks with pressurized gas.

The invention relates more particularly to an installation for filling tanks with pressurized gas, particularly with pressurized hydrogen, comprising a source of liquefied gas and a fluid-transfer circuit comprising an upstream end connected to the source and at least one downstream end intended to be connected to a tank that is to be filled, the transfer circuit comprising, arranged in series from upstream to downstream, a member for displacing the fluid coming from the source in the downstream direction, a temperature regulating device configured to allow the temperature of the fluid to be regulated between at least two distinct temperatures, a buffer storage reservoir comprising an inlet connected to an outlet of the heating device and an outlet connected to the downstream end of the transfer circuit, which means to say that the fluid supplied to the tank that is to be filled has to pass via the buffer storage reservoir, the installation comprising an electronic data processing and storage member configured to control at least the temperature regulating device. In order to offer high-capacity hydrogen vehicle refilling stations, a supply of liquid hydrogen is required. The supply of liquid liquefied gas also provides the station with a source of cold energy. Other cold sources may also be available at the stations. In order to fill vehicles, the hydrogen actually generally needs to be (pre-)cooled to −30° C.--40° C.

Related Art

The pre-cooling of the hydrogen prior to filling vehicle tanks is very demanding. The flow that is to be cooled is generally at a high pressure (100-1000 bar) at a highly variable flow rate (0.5-3.6 kg/min) and with highly variable inlet temperatures (ambient temperature, −20° C. to 40° C.). Fine temperature regulation is required, with a tolerance of just a few degrees in the range from −40° C. to −33° C.

The cold flows available have very different characteristics: very low temperature (−253° C. for liquid hydrogen, or in the range −193° C. to −123° C. at the outlet side of the cryogenic pumps); variable pressure and flow rates that differ according to the installation.

Various solutions are known, cf. WO2017186337A or U.S. Pat. No. 5,479,966 for example.

However, these solutions do not allow effective management of the cold and hot flows when using the station.

SUMMARY OF THE INVENTION

It is an object of the present invention to alleviate all or some of the above-mentioned disadvantages of the prior art.

To this end, the installation according to the invention, in other respects in accordance with the generic definition thereof given in the above preamble, is essentially characterized in that the electronic data processing and storage member is configured to supply fluid to the buffer storage reservoir at a relatively higher first temperature while fluid is being withdrawn from the buffer storage reservoir to fill a tank, and to supply fluid to the buffer storage reservoir at a relatively lower second temperature when fluid is not being withdrawn from the buffer storage reservoir to fill a tank.

Moreover, embodiments of the invention may comprise one or more of the following features:
- the liquid displacement member comprises a cryogenic pump,
- the temperature regulating device comprises a portion of the transfer circuit which is duplicated, having two parallel pipes one of which comprises an exchanger for warming the fluid, the temperature regulating device comprising a set of valves configured to dictate the distribution of the fluid coming from the source into the two parallel pipes so as to regulate the temperature of the fluid downstream of the temperature regulating member,
- the buffer storage reservoir is a tank comprising thermal insulation,
- the transfer circuit comprises, downstream of the buffer storage reservoir, at least one of the following: an expansion valve, a heat exchanger configured to regulate the temperature of the fluid, The invention also relates to a method for filling tanks with pressurized gas, particularly with pressurized hydrogen, using an installation according to any one of the features above or below, in which the method comprises, simultaneously with a transfer of fluid towards a tank from the buffer storage reservoir, a first step of transferring fluid to the buffer storage reservoir at a determined first temperature.

According to other possible specific features:
- the method comprises, after a transfer of fluid to a tank from the buffer storage reservoir, a second step of transferring fluid to the buffer storage reservoir at a second temperature relatively lower than the first temperature,
- the first temperature is comprised between 230K and ambient temperature,
- the second temperature is comprised between 50 and 150K,
- during the first step of transferring fluid to the buffer storage reservoir, the flow rate and/or the temperature of the fluid supplied to the storage facility is controlled in order to prevent a drop in pressure and/or a drop in temperature within the buffer storage reservoir or in order to reduce the drop in pressure and/or the drop in temperature within the buffer storage reservoir below a determined value.

The invention may also relate to any alternative device or method comprising any combination of the above or following features within the scope of the claims.

BRIEF DESCRIPTION OF THE FIGURES

Other specific features and advantages will become apparent from reading the following description, given with reference to the single FIGURE which schematically and in simplified form depicts one example of the structure and operation of an installation according to the invention.

DETAILED DESCRIPTION OF THE INVENTION

The installation 1 comprises a source 2 of liquefied gas (for example an insulated vacuum tank) and a fluid transfer circuit 3 comprising an upstream end connected to the source 2 and at least one downstream end intended to be connected to a tank 12 that is to be filled (it is possible to conceive of there being several downstream ends in order to fill several distinct tanks).

The transfer circuit 3 comprises, arranged in series from upstream to downstream, a member 4 for displacing the fluid coming from the source in the downstream direction (for example a pump), a temperature regulating device 5, 6, 7 configured to make it possible to regulate the temperature of the fluid between at least two distinct temperatures, and a buffer storage reservoir 8.

As illustrated, downstream, the transfer circuit 3 may also comprise an expansion valve 7 and a heat exchanger 5 for regulating the temperature prior to transfer to the tank 12.

The buffer storage reservoir 8 comprises an inlet connected to an outlet of the heating device 5, 6, 7 and an outlet connected to the downstream end of the transfer circuit 3. What that means to say is that the fluid supplied to the tank 12 that is to be filled has to pass through the buffer storage reservoir 8 (as an alternative, a number of buffer storage reservoirs in parallel may be envisaged). The buffer storage reservoir 8 is, for example, a tank comprising thermal insulation (for example a type-I or a type-II tank).

All or some of the members of the installation (valves, pumps, etc) may be controlled by an electronic data processing and storage member 10 notably configured to control at least the temperature regulating device 5, 6, 7.

As illustrated, the temperature regulating device preferably comprises a portion of the transfer circuit which is duplicated, having two parallel pipes one of which comprises an exchanger 5 for warming the fluid, the temperature regulating device comprising a set of valves configured to dictate the distribution of the fluid coming from the source into the two parallel pipes so as to regulate the temperature of the fluid downstream of the temperature regulating device. By distributing the liquid withdrawn from the source 2 between one or both of the two parallel legs it is possible to control and vary the temperature of the fluid between a low temperature (when all of the flow avoids the warming exchanger 5) and a high temperature (when all of the flow passes through the warming exchanger 5). Between these two temperatures, there are one or several intermediate temperatures that can be achieved.

According to one advantageous feature, the electronic data processing and storage member 10 may be configured to supply fluid to the buffer storage reservoir 8 at a relatively higher first temperature while fluid is being withdrawn from the buffer storage reservoir 8 to fill a tank 12, and to supply fluid to the buffer storage reservoir 8 at a relatively lower second temperature when fluid is not being withdrawn from the buffer storage reservoir 8 to fill a tank 12.

Thus, the structure of the installation can be relatively simple and comprise just one storage facility 2 by way of a source of liquid hydrogen, a cryogenic pump 4, a small atmospheric heater 5, one or more buffer storage reservoirs 8 with a simple regulating system.

The liquid hydrogen may be pumped directly at cryogenic temperature from the source 2 towards the buffer storage reservoir 8.

The buffer storage reservoir 8 is preferably thermally insulated and maintains a cold temperature in order to be ready to supply relatively cold hydrogen to a tank 12.

During the phase of filling a tank 12, the pump 4 may supply pumped hydrogen warmed by the heater 5 in order to maintain the pressure and temperature of the buffer storage reservoir 8 while fluid is being withdrawn from it.

Between two filling operations, the buffer storage reservoir 8 may be filled once again with relatively colder fluid. During this filling phase, the pump 4 may supply colder hydrogen via the path that avoids the heater 5, in order to compensate for the adiabatic heating in the filling of the buffer storage reservoir 8.

This mode of operation makes it possible to keep the buffer storage reservoir 8 at a near-constant cold temperature lower than the temperature required at the downstream end of the transfer circuit (for example 200-230K) in order to compensate for the Joule-Thomson effect.

During a filling of a tank 12, the outlet temperature regulator 5 may, where appropriate, provide fine adjustment of the temperature of the fluid transferred.

This structure makes it possible to use the cold energy at the outlet of the pump 4 in a way that is simple and effective. Indeed no special exchanger is required to achieve this effect, nor any complex controlling of a control valve.

All of the cold capacity of the pumped liquid hydrogen can be employed. Electrical power consumption remains minimal at any heat exchanger 11 acting as a heater (for example electric heater) that may be present, which does nothing more than provide top-up heating by a few degrees Celsius for example.

This architecture and the operation thereof also allows the delivery rate of the pump 4 to be dissociated from the filling delivery rate. This makes it possible to use a relatively low-output pump 4 and a simple control of filling rate from a high-pressure buffer storage reservoir 8 which is well known from filling stations supplied with gas.

The fact that the buffer storage reservoir 8 is filled with warmed hydrogen during phases in which fluid is being withdrawn therefrom also makes it possible to maximize the capacity of the buffer storage reservoir 8 and minimize the drop in pressure therein.

The buffer storage reservoir 8 is thermally insulated and is maintained, or can be maintained, at a relatively low temperature, for example between 200 and 230K. The buffer storage reservoir 8 is preferably thermally insulated in order to minimize heat losses. Methods for insulating at this temperature are well known. It also needs to be able to withstand cryogenic temperatures.

For preference, the heat capacity of the metal (or other material) of which the buffer storage reservoir is made is at least twice as high as the heat capacity of the gas contained within it, so as to limit pressure/temperature variations. The thickness of insulation may be calculated according to the total heat capacity of the system (gas+buffer storage reservoir).

This makes it possible for example to limit pressure variations to 30 bar and temperature variations to 10° C. after 12 hours on standby with foam insulation less than 10 cm thick.

This storage facility 8 is preferably of type-I or type-II.

During a filling of a tank 12, hydrogen is withdrawn from the buffer storage reservoir 8 at low temperature and may be expanded in a downstream filling regulating valve 9 (for example of Joule-Thomson type). The temperature of the buffer storage reservoir 8 may be rated so that this expansion does not heat the hydrogen above −33° C. This temperature may be comprised between 200K and 230K for example. During this phase, the hydrogen leaving the buffer storage reservoir 8 may then as appropriate pass into a regulating valve 9 that allows fine adjustment of the temperature of the gas directed towards the filling nozzle connected to the tank 12 that is to be filled.

During this filling phase, the pump 4 may at the same time contribute to the filling of the buffer storage reservoir 8 so as to minimize the drop in pressure and temperature therein.

In order to do this, the fluid leaving the pump 4 may be completely warmed by the ambient heater 5 before entering the buffer storage reservoir 8.

The corresponding valve 6 may remain fully closed.

This admission of relatively warm hydrogen makes it possible to minimize the drop in temperature and in pressure by adiabatic expansion in the buffer storage reservoir 8.

With this mode of operation, the pressure and temperature in the buffer storage reservoir 8 vary little during the filling of a tank 12 even though the output of the pump is far smaller than the filling delivery output, thanks to the thermal inertia of the buffer storage reservoir(s) 8 and thanks to the addition of relatively warm hydrogen.

The heat exchanger 11 may be an electric heater or a cold energy store at a temperature in the range (−33° C. to −45° C.) using latent heat or sensible heat.

During the phase of filling the buffer storage reservoirs 8 (outside of the filling of a tank 12), the pump 4 may supply a "semi-cryogenic" hydrogen to the storage reservoir 8. Thus, when the temperature of the buffer storage reservoir 8 reaches a high threshold (for example between 220-230K), the liquid hydrogen from the source 2 can be pumped up to the pressure of the buffer storage reservoir 8 (for example a pressure comprised between 400 and 900 bar).

This cryogenic hydrogen (temperature for example between 80 and 50K) leaving the pump 4 may be directed straight into the buffer storage reservoir 8 in order to pressurize same. At this filling temperature, a storage reservoir 8 may gradually drop in temperature by the order of (0.5 to 5 K per filling cycle depending on the metallic mass of the storage reservoir 8). When the temperature of the buffer storage reservoir 8 reaches a low threshold (for example around 200K), the high-pressure hydrogen from the pump 4 may be directed to pass through the atmospheric heater 5 in order to avoid excessively cooling the buffer storage reservoir 8.

During phases of non-use without the input of frigories from the pumped hydrogen, the heat losses may cause the pressure and temperature in the buffer storage reservoir 8 to rise.

The high thermal inertia of the buffer storage reservoir 8 may make it possible in part to smooth these temperature variations. For example, simple insulation (of the foam type for example) may be sufficient to reduce these losses to the order of 50-100 W per 100 l of buffer storage reservoir 8 at a temperature between 200 and 230K. The quality of the insulation (for example the thickness of the insulation) may be rated to ensure that this rise in pressure and in temperature remains limited over a specified standby time. For example, the expectation is typically a rise of less than 50 bar and less than 20K for a standby time of the order of 12 hours. The pressure and temperature setpoint may also incorporate a margin to account for these increases.

The buffer storage reservoir 8 may have a pressure setpoint that is 30 to 50 bar lower than its maximum operating pressure.

Likewise, this buffer storage reservoir 8 may have a temperature setpoint from 10 to 20K below the temperature required for filling with Joule-Thomson effect.

As mentioned above, the buffer storage reservoir 8 may comprise several storage reservoirs used in cascade at different pressure levels (for example, one for a pressure between 400 and 700 bar and another for a pressure between 800 and 900 bar). This makes it possible to limit the Joule-Thomson effect.

The invention allows tanks to be filled with pressurized hydrogen notably in liquid and/or gaseous form and notably in supercritical form.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. An installation for filling tanks with pressurized fluid, comprising a source of liquefied gas, an electronic data processing and storage member, and a fluid-transfer circuit that comprising an upstream end connected to the source and at least one downstream end intended to be connected to the tank that is to be filled, the transfer circuit comprising, arranged in series from upstream to downstream, a member for displacing the fluid coming from the source in the downstream direction, a temperature regulating device configured to allow the temperature of the fluid to be regulated between at least two distinct temperatures, a buffer storage reservoir comprising an inlet connected to an outlet of the temperature regulating device and an outlet connected to the downstream end of the transfer circuit so that the fluid supplied to the tank that is to be filled has to pass through the buffer storage reservoir, the electronic data processing and storage member configured to control at least the temperature regulating device, to supply fluid to the buffer storage reservoir at a relatively higher first temperature while fluid is being withdrawn from the buffer storage reservoir to fill a tank, and to supply fluid to the buffer storage reservoir at a relatively lower second temperature when fluid is not being withdrawn from the buffer storage reservoir to fill a tank.

2. The installation of claim 1, wherein the liquid displacement member comprises a cryogenic pump.

3. The installation of claim 1, wherein the temperature regulating device comprises a portion of the transfer circuit which is duplicated, having two parallel pipes one of which comprises an exchanger for warming the fluid, the temperature regulating device comprising a set of valves configured to dictate the distribution of the fluid coming from the source into the two parallel pipes so as to regulate the temperature of the fluid downstream of the temperature regulating device.

4. The installation of claim 1, wherein the buffer storage reservoir is a tank comprising thermal insulation.

5. The installation of claim 1, wherein the transfer circuit comprises, downstream of the buffer storage reservoir, at least one of the following: an expansion valve, a heat exchanger configured to regulate the temperature of the fluid.

6. A method for filling tanks with pressurized fluid using the installation of claim 1, comprising a step of transferring fluid towards a tank from the buffer storage reservoir that is simultaneous with a step of transferring fluid to the buffer storage reservoir at a determined first temperature.

7. The method of claim 6, further comprising, after a transfer of fluid to a tank from the buffer storage reservoir, a step of transferring fluid to the buffer storage reservoir at a second temperature that is lower than the first temperature.

8. The method of claim 7, wherein the first temperature is between 230K and ambient temperature.

9. The method of claim 6, wherein the second temperature is between 50 and 150K.

10. The method of claim 6, wherein, during the step of transferring fluid to the buffer storage reservoir, a flow rate and/or a temperature of the fluid supplied to the buffer storage reservoir is controlled in order to prevent a drop in pressure.

11. The method of claim 6, wherein, during the step of transferring fluid to the buffer storage reservoir, a flow rate and/or a temperature of the fluid supplied to the buffer storage reservoir is controlled in order to reduce a drop in pressure and/or a drop in temperature within the buffer storage reservoir below a determined value.

12. The method of claim 11, wherein the pressurized gas is pressurized hydrogen.

13. The method of claim 6, wherein the pressurized fluid is a pressurized gas.

* * * * *